United States Patent [19]
Vestesen

[11] Patent Number: 5,740,677
[45] Date of Patent: Apr. 21, 1998

[54] METHOD AND PLANT FOR USE IN STAND-ALONE PLANTS, PREFERABLY A WIND/DIESEL PLANT

[76] Inventor: Søren Qvist Vestesen, Stenrosevej 26, Beder, DK-8330, Denmark

[21] Appl. No.: 700,439

[22] PCT Filed: Feb. 16, 1995

[86] PCT No.: PCT/DK95/00066

§ 371 Date: Aug. 19, 1996

§ 102(e) Date: Aug. 19, 1996

[87] PCT Pub. No.: WO95/22692

PCT Pub. Date: Aug. 24, 1995

[30] Foreign Application Priority Data

Feb. 17, 1994 [DK] Denmark .................. 0190/94

[51] Int. Cl.6 .................................................. F01B 21/04
[52] U.S. Cl. ......................................... 60/698; 60/708
[58] Field of Search ................................ 60/698, 708

[56] References Cited

U.S. PATENT DOCUMENTS

| 4,122,679 | 10/1978 | Charon | 60/599 |
|---|---|---|---|
| 4,189,925 | 2/1980 | Long | 60/698 |
| 5,528,901 | 6/1996 | Willis | 60/708 |

FOREIGN PATENT DOCUMENTS

| 46530 | 3/1982 | European Pat. Off. |
|---|---|---|
| 144822 | 1/1921 | United Kingdom . |
| 2125486 | 3/1984 | United Kingdom . |
| 2246602 | 2/1992 | United Kingdom . |

*Primary Examiner*—John T. Kwon
*Attorney, Agent, or Firm*—Watson Cole Stevens Davis, P.L.L.C.

[57] ABSTRACT

A method and a plant for combined production of electricity and fresh water in a stand-alone plant of the wind/diesel type. The method enables the simultaneous production of electricity and fresh water with optimal use of the various units of the plant under all conditions of operation by optimally utilizing the wind energy and minimizing fuel consumption. A continuously operating diesel engine controls the line frequency and the power supply without any energy being accumulated. A preferred embodiment of the plant includes a first closed fluid circuit and a second open fluid circuit, the first closed circuit including at least an electric heating unit receiving energy from a wind turbine, an internal-combustion engine, preferably a diesel engine, and a distillation unit. The distillation unit constitutes a unit common to the first closed and the second open circuits.

12 Claims, 3 Drawing Sheets

5,740,677

METHOD AND PLANT FOR USE IN STAND-ALONE PLANTS, PREFERABLY A WIND/DIESEL PLANT

BACKGROUND OF THE INVENTION

The present invention relates to a method for operating a plant, preferably a wind/diesel plant, comprising at least an internal-combustion engine, a wind turbine, a distillation unit, and a first closed fluid circuit containing heating and cooling devices, and a second open fluid circuit.

The invention further relates to a plant for use by the method.

In residential areas in which the access to necessities such as electricity and fresh water is difficult or nonexisting, it is possible to erect a so-called stand-alone plant of the wind/diesel type.

GB 2,246,602 discloses a stand-alone plant for the production of electricity and comprising one or several wind turbines, a dumpload for dumping the electrical energy not consumed, and a diesel engine. The plant is further provided with a flywheel for energy storage. The wind turbines drive an induction generator whereas the diesel engine drives a synchronous generator. The flywheel is driven by, respectively drives an induction engine, respectively generator. All generators are connected to a consumer grid and the connection may be disconnected if power must be supplied to the consumer grid by the electricity producing unit in question. Plants corresponding to the one described above are also known from the research centre of Risø Forskningscenter.

The disadvantage of that plant, among other things, is the necessity of having to disconnect one or both generators when the electricity consumption is low. In this manner valuable electricity production may be lost. Furthermore, the plant is built up of several individual units the only common purpose of which is the production of electricity, so that the plant is very dependant on the consumption of electricity.

Furthermore, deteriorated operation of the diesel engine will be pronounced in cases when it runs at a low load.

GB 2,125,486 discloses a plant largely corresponding to the plant disclosed in GB 2,246,602. The plant is provided with special hydraulic energy storage means and it is stated that other energy resources than wind energy and the energy of a diesel engine may be used, such as solar energy, tidal energy, wood burning or steam engines. Otherwise, however, the plant possesses the same disadvantages as the plant disclosed in GB 2,246,602.

U.S. Pat. No. 4,122,679 discloses a method and a device for increasing the output of a diesel engine at low loads by preheating the intake air of the engine before it is led into the engine. This is accomplished by a separate fluid circuit being heated by the exhaust gases of the engine and thereafter being led to a heat exchanger in the intake air duct of the engine for heating the intake air.

That document merely describes a way of heating the intake air of a diesel engine, and it is not shown in conjunction with a stand-alone plant or in any other conjunction with the production of electricity. Furthermore, it is disadvantageous to preheat the intake air of the engine when running at low load by using the exhaust gases since there is not much heating capacity in the gases when the engine operates at low load.

It is the object of the present invention to disclose a method and a plant of the type discussed above and allowing continuous utilization of the electrical energy produced, and wherein there is at the same time optimal utilization of the power machines used for the production of electricity.

This object is achieved by a method characterized in that the fluid of the first closed circuit is led through an electric heating unit being supplied with energy from the wind turbine and the internal-combustion engine and through the cooling system of an internal-combustion engine and a distillation unit in which a thermal energy transfer is established with the liquid of the second open circuit, and that fluid from the first closed circuit is fed into the cooling system of the internal-combustion engine and regulated depending on the temperature of the fluid in an outlet of the cooling system of the internal-combustion engine, and that the operation of the engine is regulated depending on the output of the wind turbine.

A preferred embodiment is characterized in that the plant is preferably a wind/diesel plant and further comprises a second open fluid circuit, and that the heat absorbing medium consists of the fluid of the second open circuit.

As an alternative to the distillation unit as the preferred heat exchange unit, a different fluid/fluid cooler or a fluid/air cooler may be used as a heat exchange unit.

A plant for use by the method is characterized in comprising a first closed fluid circuit in which at least one electric heating unit, a connection to a cooling system of an internal-combustion engine and a distillation unit are provided, in that a connection to the distillation unit is also provided in a second open fluid circuit, and in that the cooling system of the combustion engine is provided with regulators for regulating the input of fluid into the cooling system from the first closed circuit.

With the above method electricity and fresh water are produced simultaneously while at the same time it is constantly ensured that the individual parts of the plant run under optimal conditions of operation. The machines producing electricity consist of generators connected to one or several wind turbines and one or several internal-combustion engines, preferably diesel engines. They may produce both electricity and excess heat which is transferred to the fluid of the first closed circuit. Besides the machines producing electricity, the fluid of the first closed circuit may also be heated by and exhaust heat exchanger and a solar heating system, and be cooled by a cooling unit, preferably a fluid/fluid cooling unit. Thus, a supplement to the energy supply from the diesel engine is supplied continuously and, therefore, the plant is able to provide power and water for a 100% supply 24 hours a day and independently of the conditions of wind and weather.

The heated fluid of the first closed circuit is used, among other things, for the production of fresh water, the fluid being led through a distillation unit. Such a unit is known per se, e.g. from big ships. The distillation unit comprises two fluid circuits. A primary circuit of heated fluid constituting part of the first closed circuit and a secondary open circuit of colder fluid intended to be distilled, preferably salt water. The salt water of the secondary open circuit is heated to the boiling point which will be lowered by maintaining a low pressure in the distillation unit. Through heat exchange with the fluid of the first closed circuit, part of the salt water is distilled, whereby a major or minor part of the water being let out of the distillation unit is fresh. If continuous production of fresh water is desired, it is obtained by supplying power to the electric heating unit until the temperature of the fluid of the first closed circuit is sufficiently high to accomplish the desired production of fresh water in the distillation unit.

Thus, besides the importance of the electricity producing machines producing a sufficient amount of electricity, it is also important that the fluid of the first closed circuit constantly has a temperature sufficiently high for distillation of the salt water. The output of the engine, and thus the emission of heat in the cooling water and the exhaust heat exchanger through the generator may, therefore, be increased in those cases when the wind turbine and the solar heat system do not have sufficient capacity to heat the fluid to the necessary temperature. Besides, the engine controls the frequency of the power supplied to the consumer grid, and therefore the engine operates at a certain minimum load. The distillation unit thus functions as a kind of dumpload when the power consumption in the consumer grid is lower than what the wind turbine and the engine supply.

The flow of fluid is constant both in the first closed circuit and the second open circuit. Therefore, the production of fresh water in the distillation unit is only dependent on the temperature of the fluid in the first open circuit. If the temperature is too low, i.e. below 65°–70° C. and most often around 60°–65° C., no fresh water will be produced. If a given production of fresh water is desired, the temperature of the fluid in the first closed circuit is raised or lowered by increasing or diminishing the power supply to an electric heating unit provided in the first closed circuit.

Furthermore, a thermal sensor is placed in the first closed circuit between the distillation unit and the inlet of fluid from the first closed circuit into the cooling system of the internal-combustion engine. This thermal sensor is connected to a fluid/fluid cooler so that a larger or smaller amount of fluid in the first closed circuit may be led through it before the fluid is led to the cooling system of the engine in those cases when the engine needs cooling with a cold fluid. In a preferred embodiment, the cooling fluid of the fluid/fluid cooler is the salt water before it is led to the distillation unit.

In those cases when the output of the wind turbine and the solar heating system is high, the internal-combustion engine will only be loaded to a small extent. In this case the engine's conditions of operation are deteriorated since the engine runs at a low temperature at the same time as the air being sucked into the engine is cold and forms a low pressure in the air intake of the engine. Among other things this results in the engine becoming sooted up and in increased grease consumption. In this case, therefore, preheating is performed both on the cooling water of the engine and on the intake air of the engine, and a secondary air input is established in order to minimize the formation of soot.

Preheating of the cooling water of the engine is performed, according to a first embodiment, by a thermal sensor being placed in an outlet of the cooling system of the engine and being connected to a valve in an inlet of the cooling system. As soon as the temperature of the outlet liquid falls below the ordinary operation temperature, the thermal sensor sends a signal to the valve in the inlet of the cooling system ordering it to increase the input of warm fluid into the cooling system. The warm fluid is led into the inlet of the cooling system from the first closed circuit immediately upstream of the distillation unit where the fluid is warmest. In order to be able to measure the temperature in the outlet in a loaded situation where the thermovalve of the engine will normally cut off the input of fluid into the outlet, a bypass valve is provided between the outlet and an overflow of the cooling system of the engine.

In an alternative and preferred embodiment preheating of the engine's cooling water is accomplished by an electric preheater inserted parallel in the cooling system of the engine. A circulation pump leads the cooling water through the electric preheater and check valves in the cooling system of the engine ensure that the cooling water will not just be led past the preheater. The wind turbine delivers the electrical energy for the preheater as the electrical energy therefrom will always be available when the preheater is being used. The preheater is precisely only used when the load of the engine is low due to the windmill producing the major amount of energy. The preheater will preferably be activated when the load of the engine falls below 15%, and it will be stopped when the load of the engine rises above 20%. Preheating of the cooling water takes place independently of any preheating of the intake air of the engine.

Preheating of the intake air of the engine is performed by leading a large or small amount of cooling air from the generator driven by the engine to the intake of the engine after it has cooled the generator and thus has been heated. The air intake of the engine is provided with two inlets, one having access to heated cooling air from the generator and one having access to cold air from the surroundings. By means of a throttle control in either of the two inlets the relation between cooling air from the generator and air from the surroundings may be regulated infinitely.

In case the production of electrical energy from the wind turbine alone exceeds the consumer load on the grid by 10 to 20%, the engine is no longer necessary as an energy source for operating the generator. The engine is then disconnected and stopped in order to save fuel. An electric coupler is provided between the engine and the generator driven by the engine so that the engine may be disconnected as a function of the produced and the consumed amount of electrical energy. However, when the engine is disconnected from the generator, problems will arise with maintaining the electric field on the consumer grid. Therefore, a dump load controlled by rounds per minute (RPM dump load) for controlling the speed of the generator is connected to the generator so that the generator may still regulate the frequency although the engine is disconnected and no longer drives the generator. In this case the generator functions merely as a device for stabilizing the electric field generated by the operation of the asynchronous generator of the wind turbine.

When the production of electrical energy from the wind turbine falls to about 15% more than the load on the consumer grid, the engine is restarted and connected to the generator via the electric coupler. The dumpload for regulating the speed of the generator is then no longer necessary and thus ceases to function.

It appears from the above that there is a high degree of interdependence between the different units of the stand-alone plant according to the present invention. This is partly due to the combined production of electricity and fresh water, but also to the fact that in the design of the plant much attention has been paid to optimal utilization of the various units in their operation and principally in the operation of the engine. This is obtained by controlling in a simple manner the energy transfer in the first closed circuit by means of a standard thermally regulated three-way valve and a control unit controlling a signal from a flowmeter in an outlet for tapping fresh water for the consumer.

DESCRIPTION OF THE DRAWINGS

The invention will now be described in further detail with reference to the attached drawing, in which

FIG. 1 illustrates an embodiment of a plant according the invention. The plant is constructed so as to be connectable to most standard sets of diesel generators and contains several units in a first closed fluid circuit 1 and a second open fluid circuit 2. A wind turbine 3 is provided which drives a generator 4 supplying power both to a consumer grid 5 and to an electric heating unit 6. The electric heating unit 6 is provided in a branch 7 of the first closed circuit 1. Furthermore, an internal-combustion engine 8 is provided, preferably a diesel engine, the cooling system of which constitutes a second branch 9 of the first closed circuit 1. Like the wind turbine, the internal-combustion engine 8 also drives a generator 10. It is common to the first closed circuit 1 and the second open circuit 2 that a distillation unit 11 is provided having a primary flow 12 which constitutes a branch of the first closed circuit 1 and a secondary flow 13 which constitutes part of the second open circuit 2. The distillation unit 11 is further provided with a separate outlet 14 for tapping fresh water. The outlet 14 is provided with a flowmeter 30.

Figure 1:
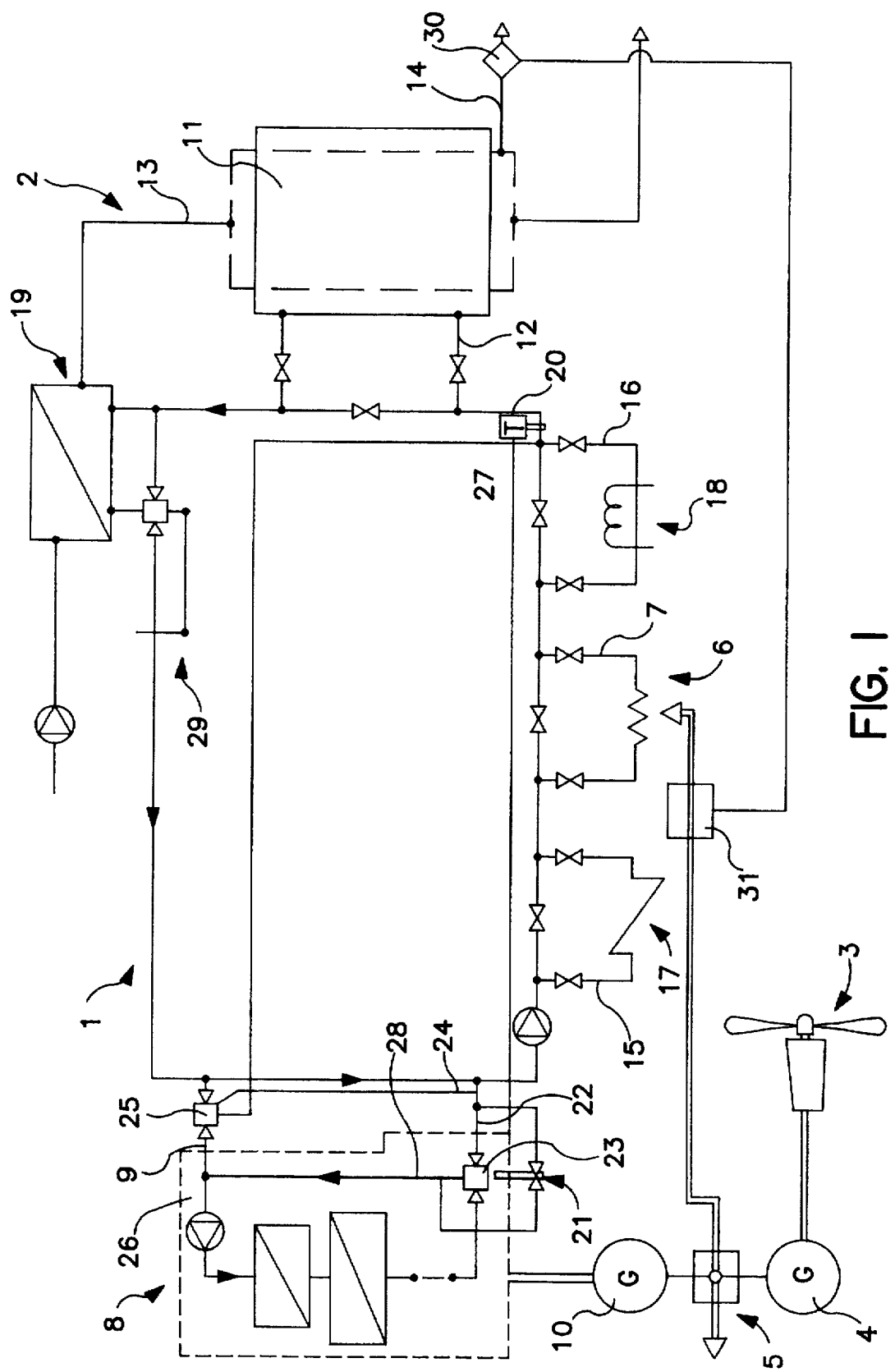
FIG. 1 shows an embodiment of a plant according to the invention for use by the method according to the invention.

In further branches 15, 16 of the first closed circuit 1 according to the illustrated embodiment of the plant there are further provided an exhaust heat exchanger 17, a solar heating system 18 and a fluid/fluid cooling unit 19. The exhaust heat exchanger 17 is intended for heating the fluid of the first closed circuit 1 before the fluid is led to the distillation unit 11 and receives heat from the exhaust gas of the internal-combustion engine 8. Likewise, the solar heating system 18 is intended for heating the fluid. The fluid/fluid cooling unit 19 is intended for cooling the fluid of the first closed circuit 1 before the liquid is led to the cooling system of the internal-combustion engine 8. The cooling medium of the fluid/fluid cooling unit 19 is the fluid of the second open circuit 2 before said fluid is led to the distillation unit 11. Alternatively, the cooling unit 19 may be comprised of a fluid/air cooling unit like in a traditional diesel engine.

The fluid circulated in the first closed circuit 1 by a circulation pump is fresh water, possibly supplied with various anti-corrosion, anti-frost or other additives. The fluid of the second open circuit 2 is generally salt water since the plant is intended for installation where the availability of fresh water is limited or nonexistent and where the distillation unit 11 is provided for the production of fresh water.

The flowmeter 30 located in the separate outlet 14 of the distillation unit 11 is used for measuring the tapped amount of fresh water. In those cases when a given amount of produced fresh water is desirable, the flowmeter 30 is connected to a control unit 31 provided in a power supply line for the electric heating unit 6 from the wind turbine 3, respectively the engine 8. The control unit gradually, and without graduations, regulates the supply of power to the electric heating unit 6 in dependance of the temperature of the fluid that it is necessary to maintain in the first closed circuit 1 in order to ensure the desired amount of produced fresh water. When the supply of power to the electric heating unit 6 is changed, the load on the engine 8 will also change and consequently the engine's production of heat for the cooling water and exhaust gas and thus for the fluid of the first closed circuit 1. This is monitored by the flowmeter 30 as a change of produced amount of fresh water, and the control unit 31 will subsequently regulate the temperature of the fluid in the first closed circuit 1. The same applies in those cases when the supply of power for the consumer grid is changed and when the output of the wind turbine 8 and/or the solar heating system 18 is changed.

Figure 3A:
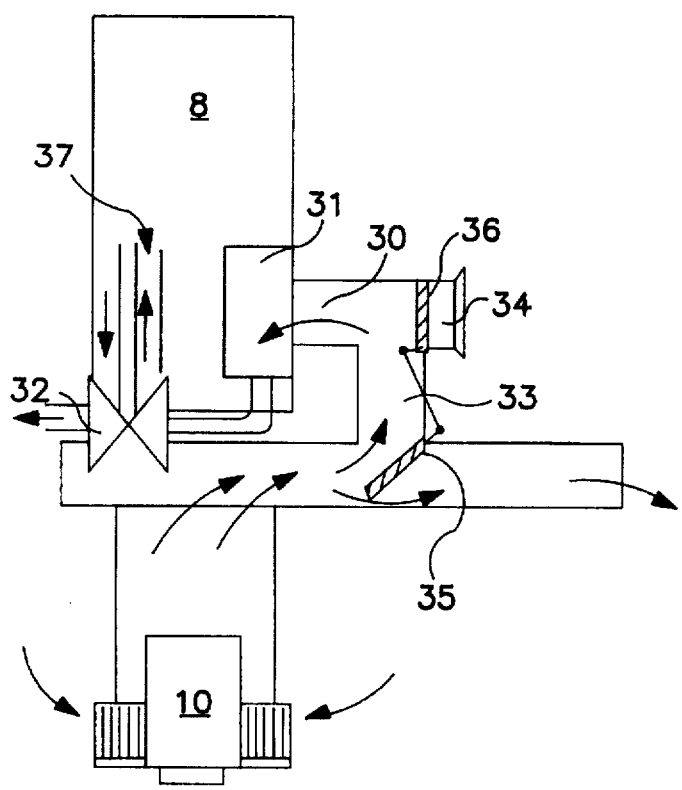
FIGS. 3A, 3B show a device for preheating intake air for an internal-combustion engine constituting part of the plant according to the invention.
Figure 3B:
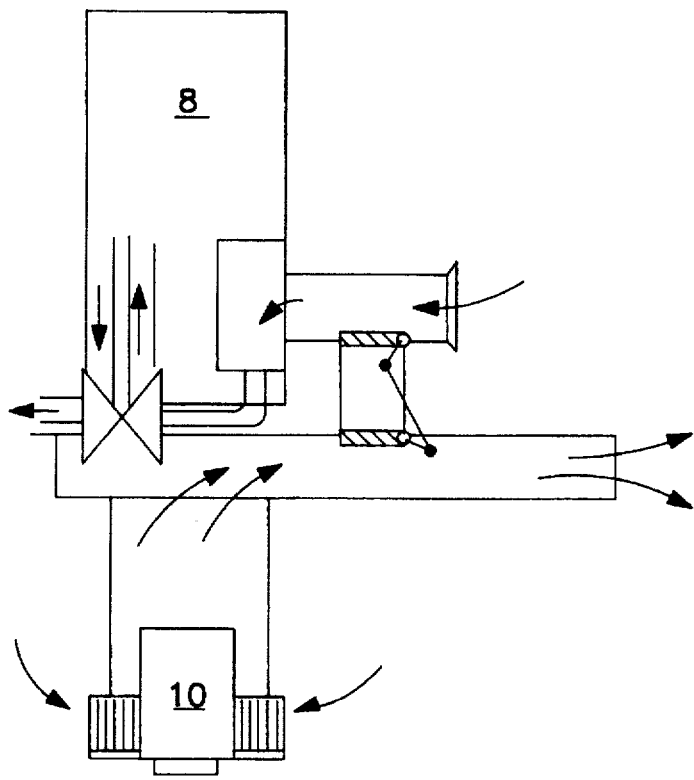

When the internal-combustion engine 8 runs at low load over some length of time, the engine's conditions of operation will deteriorate if no precautions are taken to prevent soot from building up. Improving the internal-combustion engine's conditions of operation is accomplished partly by heating the engine's cooling water and partly by preheating and regulating the pressure of the engine's intake air. FIG. 1 illustrates the former regulation whereas FIGS. 3A and 3B illustrate the latter regulation.

Regulating the cooling water temperature is done by means of a thermal sensor 24 located in the outlet 22 of the cooling system and connected to a three-way valve 25. The three-way valve 25 corresponds with an inlet 26 of the cooling system and with the first closed circuit 1 at a position 27 immediately before that circuit is led to the distillation unit 11. At the same time the bypass valve 21 is established between the outlet 22 of the cooling system and an internal bypass 28 in the engine 8.

When the thermal sensor 24 registers that the temperature of the fluid in the cooling system outlet 22 falls below a certain value, typically about 75° C., the sensor transmits a signal for the three-way valve 25 to increase the inlet of fluid from the first closed circuit 1. At a low load the engine's own thermovalve 23 is usually closed so that no fluid is led to the outlet 22 but only to the bypass 28. In order that the thermal sensor 24 may still be allowed to register the temperature of the fluid circulating in the cooling system of the engine 8, part of that fluid is diverted, via the bypass valve 21, past the thermovalve 23 from the bypass 28 of the cooling system to the outlet 22, but only when the temperature of the fluid at the position 27 is about 85°–90° C., i.e. in those cases when sufficient wind energy is available. The thermostat 20 ensures that during the start and heating of the engine 8, the bypass valve 21 will not be opened so as to obtain as rapid heating of the engine as possible.

The fluid of the first closed circuit 1 is maintained within certain temperature intervals by regulating the power supply for the electric heating unit 6, thus securing a sufficient temperature for the production of fresh water in the distillation unit 11. The temperature inside the circuit immediately before the inlet of the cooling system of the engine 8 is typically constant at about 65° C. As soon as the three-way valve 25 is opened, warmer fluid will flow into the cooling system of the engine from the first closed circuit from the position 27, immediately before the fluid is led to the distillation unit. The temperature of this fluid is typically about 90° C. and the operation temperature of the engine at low load is increased, resulting in improved operation.

In order to secure a constant temperature of the fluid in the first closed circuit 1 in the portion situated downstream of the distillation unit 11, the circuit is equipped with a thermal sensor 29. This thermal sensor 29 is located downstream of the distillation unit and is comprised of a three-way thermovalve connected to the fluid/fluid cooling unit 19. Downstream of the distillation unit 11, the unit may either be led out of the distillation unit or past it in cases when the distillation unit is out of operation.

If the temperature of the fluid led out of or past the distillation unit 11 is too high compared to the constant temperature it is desired to maintain in this part of the first closed circuit, the thermovalve 29 will let a large or small amount of fluid through the fluid/fluid cooling unit 19. Here the fluid is cooled by means of the salt water before the latter is led to the distillation unit 11.

Figure 2:
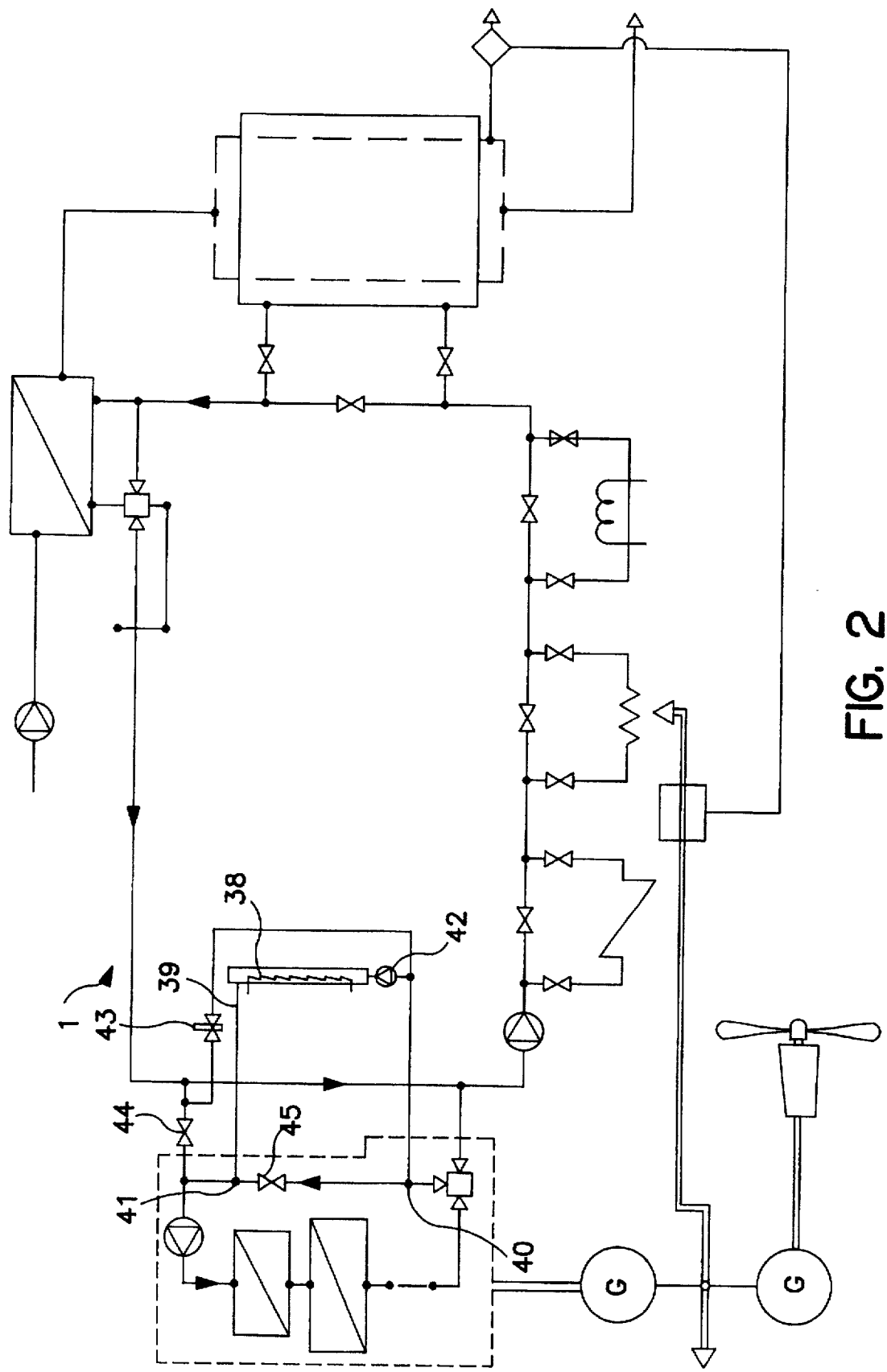
FIG. 2 shows an alternative and preferred embodiment of a plant according to the invention.

FIG. 2 illustrates an alternative and preferred embodiment of a plant according to the invention. The plant illustrated in FIG. 2 is a plant largely identical with the plant illustrated in FIG. 1. The difference exists in the manner in which the fluid in the cooling system of the engine is preheated. In the plant illustrated in FIG. 2 the preheating of the engine's cooling fluid is accomplished by means of an electric heating element 38 connected to the engine's cooling system in a parallel circuit 39. The parallel circuit 39 is connected to the engine's cooling system in a first point 40 and a second point 41. The electric heating element 38 receives electric energy from the wind turbine 3. In the parallel circuit 39 there are further provided a circulation pump 42, respectively a valve 43, which leads the fluid through the circuit, respectively allows the opening and closing of the circuit.

A first check valve 44 is arranged in the inlet 26 from the first closed fluid circuit 1 to the engine's cooling system. A second check valve 45 is arranged within the engine's cooling system between the points 40, 41 in which the parallel circuit 39 with the electric heating element 38 is connected to the cooling system. The check valves 44, 45 ensure that fluid which has been preheated by means of the electric heating element 38, having been led through the parallel circuit 39, is not subsequently just led past the cooling system of the engine. The check valve 44 further ensures that fluid may circulate in the circuits when the engine has been stopped so that no boiling will take place in the fluid present in the parallel circuit 39.

This way of preheating the fluid in the engine's cooling system is simpler than the way illustrated and described with reference to FIG. 1.

FIG. 3A and FIG. 3B illustrate how the intake air of the internal-combustion engine is heated when the engine is running at low load. The heating of the intake air constitutes a supplement to the heating of the cooling water as described in the description for FIG. 1. An air intake 30 of the engine, and in the shown embodiment that of an air filter 31 and a turbo-charger 32 thereof, is provided with two inlets 33, 34. A first inlet 33 which is connected to the cooling air from the generator 10 that the engine 8 drives, and a second inlet 34 which is connected to the surrounding air. Either of the two inlets 33, 34 is provided with throttles 35, 36 which are interconnected. When the throttle 36 for admission of air from the surrounds is open, the throttle 35 for admission of cooling air from the generator 10 is closed, and vice versa, illustrated in FIG. 3A and FIG. 3B, respectively. Either of the two throttles 35, 36 may furthermore be in any intermediate relative position.

When the engine 8 is running at normal or high load, it is not necessary to heat the intake air initially, so all the intake air is then drawn from the second inlet 34 which, as mentioned, is connected to the air of the surroundings, see FIG. 3A. When the engine 8 is running at low load, the intake air is both preheated and pressurized. This is accomplished by drawing all the intake air from the first inlet 33 which, as mentioned, is in connection with the cooling air from the generator 10, see FIG. 3B. The preheated air is under pressure after having passed the generator 10. Thus, the turbo-charger is kept running and the pressure in the receiver 37 of the engine is maintained at not less than 1 bar so that there will not be low pressure in the inlet of the engine, the throttle 35 allowing a suitable amount of air from the generator to pass through to the engine.

It appears from the above that a large part of the method and the plant for use by the method is directed towards securing optimal conditions of operation of the internal-combustion engine at low loads. However, a further important feature of the invention is that a sufficient distribution of electricity and fresh water to the consumers is maintained irrespective of the conditions of wind and weather.

I claim:

1. A method for operating a plant that includes at least an internal-combustion engine (8), a wind turbine (3), at least one heat exchange unit (11) as a distillation unit, and a first closed fluid circuit (1) containing heating and cooling devices, wherein fluid of the first closed fluid circuit (1) is led through an electric heating unit (6) which is supplied with energy from the wind turbine (3) and from the internal-combustion engine (8), and through a cooling system (9) of the internal-combustion engine (8) and the at least one heat exchange unit (11) with a second open fluid circuit (2) in which a thermal energy transfer is established with a heat-absorbing medium, and wherein fluid from the first closed circuit is led to the cooling system of the combustion engine (8) and regulated depending on the temperature of the fluid in an outlet of the cooling system (9) of the internal-combustion engine (8), and wherein the operation of the engine (8) is regulated depending on the output of the wind turbine (3).

2. A method according to claim 1, wherein the plant is a wind/diesel plant, and the heat-absorbing medium consists of the fluid of the second open circuit (2).

3. A method according to claim 1, wherein the fluid of the first closed circuit (1) is also led through an exhaust heat exchanger (7), a solar heating system (18) and a fluid/fluid cooling unit (19) in which a thermal contact is established with the second open circuit (2).

4. A method according to claim 1, wherein the fluid of the first closed circuit (1) is led through or past the electric heating unit (6), the cooling system (9) of the internal-combustion engine (8), the distillation unit (11), the exhaust heat exchanger (17), the solar heating system (18) and the cooling unit (19), these parts of the plant being provided in branches of the first closed circuit (1), and wherein a constant amount of fluid is led through these branches.

5. A method according to claim 1, wherein temperature measurement is performed in a number of places in the first closed circuit (1), wherein valves in the first closed circuit (1) are controlled by the temperature measurements, and wherein the input of fluid into the cooling system (9) of the combustion engine (8) and into the cooling unit is regulated by the valves.

6. A method according to claim 1, wherein the output of the internal-combustion engine (8) is regulated depending on the output of the wind turbine (3), wherein cooling air from a generator (10) is led to a first inlet (33) of an air intake (30) of the internal-combustion engine (8), wherein air form the surroundings is led to a second inlet (34) of the air intake (30) of the combustion engine (8), and wherein a relation between the amount of cooling air from the generator (10) and, respectively, the amount of air from the surroundings is regulated.

7. A plant for accomplishing the method according to claim 1 comprising a first closed fluid circuit (1) in which at least one electric heating unit, a connection to a cooling system of an internal-combustion engine (8) and a distillation unit (11) are provided, a connection to the distillation unit (11) is also provided in a second open fluid circuit (2), the cooling system (9) of the combustion engine (8) is provided with regulators for regulating the input of fluid into the cooling system from the first closed circuit (1), and the cooling system (9) is regulated depending on the temperature of the fluid in an outlet of said cooling system (9).

8. A plant according to claim 7, wherein the first closed circuit (1) also comprises an exhaust heat exchanger (7), a solar heating system (18) and a connection to a fluid/fluid cooling unit (19) for cooling the fluid of the circuit (1), and a connection to the cooling unit (19) is also provided in the second open circuit (2).

9. A plant according to claim 7, wherein the first closed circuit (1) is provided with first, second and third thermal sensors, said first thermal sensor (24) is located in the outlet (22) of the cooling system of the internal-combustion engine (8), said second thermal sensor (29) is located downstream of the cooling unit (19), and said third thermal sensor is located upstream of the distillation unit (11).

10. A plant according to claim 7, wherein the first closed circuit (1) is provided with at least one thermal sensor (24) which is located in the outlet (22) of the cooling system of the internal-combustion engine and is connected to a valve (25) positioned between the first closed circuit (1) and the inlet of the cooling system of the internal-combustion engine (8), said valve constitutes a three-way valve having connections to the first closed circuit (1) immediately before it is led to the distillation unit (11), to the input line between the first closed circuit (1) and the engine's cooling system, and to the inlet of the cooling system.

11. A plant according to claim 7, including a two-way bypass valve (21) for the thermovalve (23) in the cooling system of the internal-combustion engine (8), said bypass valve (21) having connection to the circuit of the cooling system and the outlet of the cooling system.

12. A plant according to claim 7, including a parallel circuit (39) in conjunction with the cooling system of the engine and connected to the cooling system of the engine (8) in a first (40) and a second point (41), an electric heating member (38) is placed in the parallel circuit (39), and a first check valve (45) is placed in the cooling system of the engine between the first (40) and the second point (41).

* * * * *